Figure 1:
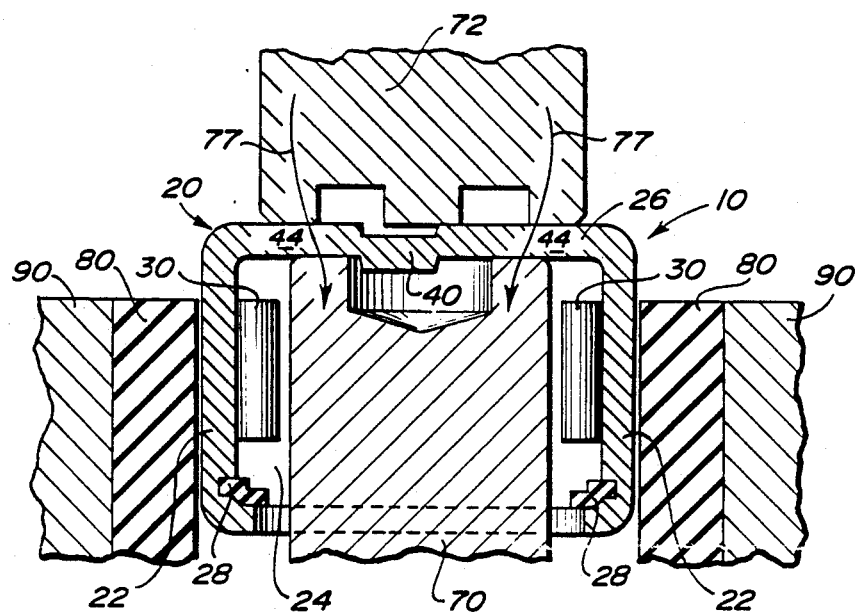

United States Patent [19]

Linnemeier

[11] Patent Number: 4,854,738
[45] Date of Patent: Aug. 8, 1989

[54] TEMPERED NEEDLE BEARING WITH DIMPLE

[75] Inventor: Elmer H. Linnemeier, Washington Depot, Conn.

[73] Assignee: The Torrington Company, Torrington, Conn.

[21] Appl. No.: 220,579

[22] Filed: Jul. 18, 1988

[51] Int. Cl.$^4$ .............. F16C 17/04; F16C 21/00; F16C 33/58; F16D 3/20

[52] U.S. Cl. .................. 384/127; 384/425; 384/564; 464/128

[58] Field of Search ........... 384/126, 127, 223, 452, 384/420, 425, 564, 569, 625, 905.1; 464/128, 132, 136

[56] References Cited

U.S. PATENT DOCUMENTS

| | | | |
|---|---|---|---|
| 3,788,712 | 1/1974 | Kohler et al. | 384/127 |
| 3,920,296 | 11/1975 | Eckhardt | 384/564 |
| 3,950,834 | 4/1976 | Pitner | 384/425 X |
| 3,954,517 | 5/1976 | Jatczak et al. | 420/119 X |
| 4,004,952 | 1/1977 | Jatczak et al. | 148/319 |
| 4,050,130 | 9/1977 | Pitner | 384/425 X |
| 4,325,593 | 4/1982 | Mallet | 384/127 X |

Primary Examiner—Thomas R. Hannon
Attorney, Agent, or Firm—Wayne O. Traynham

[57] ABSTRACT

A drawn cup needle bearing with an open end and a covered end contains multiple roller elements in a retainer or cage. The bearing is installed on a trunnion of a universal joint and has a protuberance projecting inwardly from the covered end so as to provide a bearing surface between the protuberance and the end of the trunnion. The protuberance is surrounded by an annular region which has been spring-tempered to allow the covered end to flex without cracking during installation of the bearing onto the trunnion and during normal operation.

3 Claims, 1 Drawing Sheet

U.S. Patent  Aug. 8, 1989  4,854,738

TEMPERED NEEDLE BEARING WITH DIMPLE

This invention relates to a closed-end bearing having a dimple or protuberance projecting axially inwardly from a covered end of the bearing. More particularly, this invention relates to such a bearing having a spring-tempered annular region surrounding the dimple so as to allow the covered end of the bearing to flex axially while withstanding cracking cause by excessive brittleness of the material surrounding the protuberance. Needle bearings of this type are well-suited for use in end-loading universal joint assemblies.

Prior art patents disclose bearing bushings with protuberances extending axially inwardly from a covered end which has not been tempered. Examples of this type of prior art include U.S. Pat. No. 3,788,712 for a "Bearing Bushing For Universal Joints" issued in the names of Hans-Joachim Kohler and Guido Rieder on Jan. 29, 1974. Kohler et al disclose a bearing bushing for accommodating the trunnion of a universal joint spider. The bushing comprises a thin-walled sheet metal bushing with one closed radial end opposite the face of a spider trunnion. This closed end is provided at its center with an inwardly directed projection adapted to abut against the trunnion end face.

One of the problems with this type of prior art is that the covered end tends to crack when the bearing bushing is installed on the universal joint trunnion. The pressure required to ensure proper positioning of the bushing on the trunnion is sometimes enough to cause the covered end to flex excessively, resulting in fracturing of the relatively hard and brittle material of the covered end.

The present invention solves this problem by providing a bearing with a covered end having a spring-tempered annular region surrounding the inwardly projecting protuberance. This annular region provides for axial flexing with increased resistance to fracturing. The material of the covered end is not as hard and brittle as the prior art material; thus, the preload thrust force applied to the covered end during installation onto the universal joint trunnion is not enough to cause cracking in the covered end. In addition, this annular region also provides increased resistance to fatigue failure of the covered end during normal operation for the same reasons described above.

Figure 2:
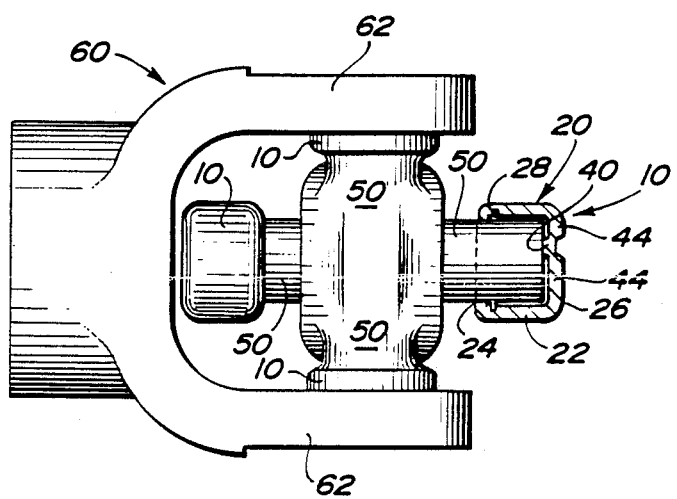

Briefly described, the bearing of the present invention comprises a drawn-cup bearing having one open end and one covered end. Multiple roller elements may be held in place inside the bearing by a retainer or cage, or a fullcomplement configuration may be used. The closed end of the bearing has a dimple or protuberance projecting axially inwardly in order to abut against the outer surface of the end of the trunnion. Around this protuberance is an annular region which has been spring-tempered so as to provide for flexing of the covered end while increasing resistance to cracking or fracturing caused by cyclical loads or by the preload thrust force applied during installation of the bearing on the universal joint trunnion. This invention may be better understood by reference to the following detailed description and drawings in which:

FIG. 1 is a side sectional view of the needle bearinq of the present invention while positioned between two electrodes which provide current to spring-temper the annular region around the covered end protuberance; and FIG. 2 is a side view in elevation of a partial universal joint illustrating the position of the needle bearings on the trunnions of the joint, with one of he needle bearings shown in a sectional view.

Referring to the drawings, and more particularly to FIG. 1, a bearing 10 of the present invention comprises a drawn cup 20 having side walls 22, an open end 24, a covered end 26, a bearing seal 28, and a full complement of roller elements 30. Multiple roller elements 30 may also be held in proper position by a cage or retainer (not shown) if desired. Covered end 26 has a dimple or protuberance 40 projecting inwardly toward open end 24, and protuberance 40 is surrounded by a heat-treated annular region 44. Turning now to FIG. 2, four bearings 10 are shown mounted on two trunnions 50 of a universal joint 60. Only one yoke 62 of joint 60 is shown to better illustrate the installation of bearings 10 on trunnions 50. One of the bearings 10 is shown in section to illustrate the contact between protuberance 40 and the end of one trunnion 50. This contact allows bearing 10 to rotate on trunnion 50 with minimal frictional force. The protuberance 40 of the preferred embodiment of the invention, as depicted in FIG. 1 and 2, is off-center relative to the center of covered end 26 of the drawn cup 20. This provides improved lubrication of the contact point between protuberance 40 and the end surface of trunnion 50. However, the location of the protuberance is not critical to this invention; therefore, protuberance 40 could be positioned in the center of the covered end 26, for example, without affecting this invention.

The important feature of this invention is the annular region 44 which surrounds protuberance 40. Region 44 is heat-treated as illustrated in FIG. 1. Bearing 10 is positioned on a lower electrode 70 positioned coaxially inside an annular ring 80 made of electrical insulating material. Ring 80 is mounted in a fixture 90, shown in a fragmentary view in FIG. 1. An upper electrode 72 is lowered onto covered end 26 of bearing 10 with sufficient pressure to ensure good contact between end 26 and electrodes 70 and 72. This provides for optimal conduction of electrical currents between electrodes 70 and 72 through covered end 26. Arrows 77 (FIG. 1) indicate the general path of electrical current flow between electrodes 70 and 72. The resulting annular region 44 may have a variable radial width which covers any portion of the region between side walls 22 and the dimple or protuberance 40.

Electrical current is pulsed between the electrodes for relatively short time periods to provide resistance heating which spring-tempers annular region 44. The time-temperature combination is important to ensure that the metallic material of covered end 26 reaches a spring temper state with a Rockwell C hardness in the general range of approximately 48 to 52. If the time-temperature parameter exceeds a threshold limit, the material will reharden rather than spring-temper and thus defeat the whole purpose of the invention. General examples of desirable time-temperature combinations include heat treatment of about one hour at a temperature of about 700 degrees Fahrenheit. In the preferred embodiment illustrated in FIG. 1, the electrical pulses have a duration of several milliseconds and result in temperatures approaching 1150 degrees Fahrenheit. Other time-temperature combinations which also result in spring-tempering annular region 44 are also acceptable for use with the present invention.

The covered end 26 of drawn cup 20 is preferably made of a martensite material which has been carburized to provide suitable hardness for the bearing surface contact between protuberance 40 and the end of trunnion 50. A typical Rockwell C hardness of this material is about 60-62. Covered end 26 could also be properly hardened by other means, such as carbonitriting, to provide a suitable bearing surface on protuberance 40. When electrical current pulses flow along paths 77 through the covered end 26, the time-temperature combinations discussed above result in a change in the material. The material in annular region 44 becomes spring-tempered martensite which is more ductile than the remaining material of the covered end 26. With a Rockwell C hardness of about 48-52, this spring-tempered annular region allows flexing of the covered end 26 in the axial direction, toward and away from the end of trunnion 50, with increased resistance to cracking and fracturing sometimes caused by the preload thrust force applied when installing bearing 10 on trunnion 50 or by the cyclical forces of normal operation of the bearing.

The main problem with cracking of bearings 10 which have not been heat-treated according to the present invention is that a certain amount of preload thrust force is normally required when installing a bearing 10 on a trunnion 50. With a certain percentage of these bearings, the preload force required exceeds the flexing capability of a covered end 26 which has not been heat-treated to provide an annular region 44. This percentage tends to be relatively high. This lack of flexing capability results from the fact that the carburized martensite material of the covered end 26 is relatively hard and brittle and is not very ductile. In addition to solving the problem of cracking and fracturing during preloading and installation, annular region 44 also provides superior resistance to fatigue failure of bearings 10 during normal operations. A covered end 26 with an annular region 44 can withstand many more load cycles without failure than can a covered end 26 which has not been spring-tempered.

Some preliminary testing by this applicant indicates that bearings which have been heat-treated to provide a spring-tempered annular region 44 will withstand loads at least four times greater than the maximum load capability of bearings which have not been heat treated. This improvement would allow a bearing to last substantially longer after being heat-treated according to the present invention. In addition, the percentage of bearings which fail during installation can be reduced to a more acceptable level approaching zero.

I claim:

1. A drawn cup for a bearing, said cup comprising a cylindrical sleeve portion having an open end and a covered end, a protuberance projecting axially inwardly from said covered end so as to provide a bearing surface, and a spring-tempered annular region surrounding said protuberance so as to allow said covered end to withstand lied axial forces without cracking, said covered end is made of carburized martensite having a Rockwell C hardness within a range of about 60 to 62, except within said annular region which is made of tempered martensite having a Rockwell C hardness within a range of about 48 to 52.

2. A draw cup bearing comprising a cylindrical sleeve portion having an open end and a covered end, a proturberance projecting axially inwardly from said covered end so as to provide a bearing surface, and a spring-tempered annular region surrounding said protuberance so as to allow said covered end to withstand applied axial forces without cracking, said covered end is made of carburized martensite having a Rockwell C hardness within a range of about 60 to 62, except within said annular region which is made of tempered martensite having a Rockwell C hardness within a range of about 48 to 52.

3. A bearing according to claim 2 further comprising multiple roller elements positioned inside said sleeve portion.

* * * * *